United States Patent
Yarabolu

(10) Patent No.: US 11,973,663 B2
(45) Date of Patent: Apr. 30, 2024

(54) ARTIFICIAL INTELLIGENCE BASED REAL-TIME SERVICE DISCOVERY AND BINDING TECHNIQUE

(71) Applicant: BANK OF AMERICA CORPORATION, Charlotte, NC (US)

(72) Inventor: Vijay Kumar Yarabolu, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/708,540

(22) Filed: Mar. 30, 2022

(65) Prior Publication Data
US 2023/0318930 A1    Oct. 5, 2023

(51) Int. Cl.
*H04L 41/16* (2022.01)
*H04L 67/133* (2022.01)
*H04L 67/51* (2022.01)

(52) U.S. Cl.
CPC ............ *H04L 41/16* (2013.01); *H04L 67/133* (2022.05); *H04L 67/51* (2022.05)

(58) Field of Classification Search
CPC ........ H04L 41/16; H04L 67/51; H04L 67/133
See application file for complete search history.

(56) References Cited

U.S. PATENT DOCUMENTS

| | | | |
|---|---|---|---|
| 10,725,759 B2* | 7/2020 | Tanabe | G06F 8/65 |
| 2011/0107313 A1* | 5/2011 | Baron | G06F 11/3612 |
| | | | 717/130 |
| 2015/0135170 A1* | 5/2015 | Murray | G06F 9/44536 |
| | | | 717/148 |
| 2015/0169386 A1* | 6/2015 | Gopalraj | G06F 8/71 |
| | | | 719/328 |
| 2021/0192401 A1* | 6/2021 | Chandrasekaran | G06Q 10/06 |
| 2022/0224770 A1* | 7/2022 | Khosrowpour | H04L 41/5054 |
| 2022/0283885 A1* | 9/2022 | Mackenzie | G06F 8/61 |
| 2022/0345459 A1* | 10/2022 | Tseng | H04L 9/3234 |
| 2023/0068386 A1* | 3/2023 | Akdeniz | G06N 3/063 |

* cited by examiner

*Primary Examiner* — Dhairya A Patel
*Assistant Examiner* — Eui H Kim
(74) *Attorney, Agent, or Firm* — Moore & Van Allen PLLC; James C. Edwards

(57) ABSTRACT

Cognitive analysis, including artificial intelligence, is implemented to dynamically determine service discovery and service binding. Specifically, cognitive analysis is used to determine a client's capabilities and based on the capabilities, a service version is selected and coupled/bound to the client. As a result of such loose coupling/binding with service signatures, service version upgrade at the client is not mandatory in the event of a server-side service version upgrade.

13 Claims, 6 Drawing Sheets

ARTIFICIAL INTELLIGENCE BASED REAL-TIME SERVICE DISCOVERY AND BINDING TECHNIQUE

FIELD OF THE INVENTION

The present invention is related to service discovery and service binding and, more specifically implementing artificial intelligence to determine what information is required to assess the capabilities of a client and, once the requisite information is gathered by the client, determine which service version is aligned with the client's capabilities and bind the determined service to the client.

BACKGROUND

Conventionally, a client initiates a web service call with service signature and requisite service body and header information. In response to a server receiving the web service call, the service is found in a server-side repository and the information in the web service call is compared with the information in the repository. If the information in the web service call and the repository match, including the version number, the information in the web service call is deemed to be validated and the web service call is further processed. In this regard, the service version residing at the client is always tied/bound, otherwise referred to as "hardwired", to a specific service version residing at the server-side. In order to change the binding both the client and the server are required to upgrade (i.e., change version). In other words, if the version at the server is updated, the client's version must also be updated. In this scenario, the client always sends the same hardwired information with each web service call irrespective of the server's requirements.

Therefore, a need exists to develop systems, methods and the like for allow for the client to loosely coupled with service signatures, such that the client is not tied/hardwired to a specific version residing at the server-side. In this regard, desired systems, methods and the like should allow for the capabilities of the client to dictate which service version is bound to the client, such that, the version residing at the client may be different than the version to which the client is coupled to. As such, desired systems, methods and the like should avoid mandatory upgrades at the client in the event of a server-side service upgrade.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for the use of cognitive analysis, including artificial intelligence, to determine a client's capabilities and, based on the determined capabilities, dynamically bind the client to a service version that is applicable to the client's capabilities.

In this regard, a cognitive agent is employed at the client-side and a cognitive engine is employed at the server-side, which communicate with one another during the initial service request communication. Initially, the client makes a generic service request call to the server requesting the information/resource from the web service. Once the server receives the generic service request call, the call is delegated to the cognitive engine, which determines the capabilities of the client through information requests communicated to and responded by the cognitive agent of the client. The information that is returned by the cognitive agent forms the basis for the cognitive engine to determine which service version to bind to the client.

As a result, the present invention provides for loosely coupling the client with service signatures. Such dynamic coupling/binding avoids the need for a mandatory version upgrade at the client in the event of a server-side version upgrade that would otherwise require the client to upgrade in-kind.

A system for real-time service discovery and service binding defines first embodiments of the invention. The system includes a plurality of client devices, each client device including a first memory and one or more first processing devices in communication with the first memory. The first memory stores one or more service applications and a cognizant agent including one or more artificial intelligence algorithms that is in communication with the one or more service applications.

The system additionally includes a server apparatus including a second memory and one or more second processing devices in communication with the second memory. The second memory stores a cognitive engine including one or more artificial intelligence algorithms that is executable at least one of the one or more processing devices. The cognitive is configured to receive a service request call from a first service application from amongst the one or more service applications executing on a first client device from amongst the plurality of client devices. In response in response to receiving the service request call, the cognitive engine is further configured to determine the capabilities of the first client device and determine a version of the service application to bind to the first client device based on the determined capabilities. In response to determining the version of the service application, the cognitive engine is further configured to bind an application programming interface (API) of the determined version of the service application to the first client device and initiate the service request call with the bound API of the determined version of the service application.

In specific embodiments of the system, the cognitive engine is further configured to determine the capabilities of the of the first client device by (i) identifying an API of a current version of the service application executing on the first client device, (ii) determining information required from the first client device to determine the capabilities of the first client device, and (iii) communicating a request for the information to the cognizant agent of the first client device. In related embodiments of the system, the cognitive agent of the first client device is configured to (i) receive the request for the information, (ii) identify and collect the information, and (iii) communicate a response that includes the identified information to the cognitive engine. According to specific embodiments of the system, the information includes at least one of (i) username, (ii) user passcode, (iii) operating system type, (iv) operating system version, (v) size of random-access memory, and/or (vi) web browser type. In other specific embodiments of the system, the cognitive engine is further configured to share a unique session token with the cognitive agent of the first client device and the cognitive agent is further configured to communicate the response along with the unique session token.

In other specific embodiments of the system, the cognitive engine is further configured to bind the application programming interface (API) of the determined version of the service application to the first client device by, in response to (i) receiving a response from the cognitive agent of the first client device that includes the information, (ii) validating the information and (iii) determining the version of the service application to bind to the first client device based on the determined capabilities, accessing a service repository that stores a plurality of versions of the service application to bind the application programming interface (API) of the determined version of the service application to the first client device. In further related embodiments of the system, the cognitive engine is further configured to initiate the service request call with the bound API of the determined version of the service application by requesting data from the determined version of the service application stored in the service repository, and, in response to receiving the data from the determined version of the service application, transforming and formatting the data for cognitive analysis at the cognitive agent of the first client device and communicating the data to the cognitive agent of the first client device. In related embodiments of the system, the cognitive agent is further configured to receive the data and parse and re-format the data to meet formatting requirements of the current version of the service application executing on the first client device.

A computer-implemented method for real-time service discovery and service binding defines second embodiments of the invention. The computer-implemented method is executed by one or more computing processor devices. The computer-implemented method includes receiving, at a server-side cognitive engine, a service request call from a service application executing on a client device and, in response to receiving the service request call, determining the capabilities of the first client device. Additionally, the computer-implemented method includes determining a version of the service application to bind to the first client device based on the determined capabilities and binding an application programming interface (API) of the determined version of the service application to the first client device. Moreover, the computer-implemented method includes initiating the service request call with the bound API of the determined version of the service application.

In specific embodiments of the computer-implemented method, determining the capabilities of the first client device further include (i) identifying an API of a current version of the service application executing on the first client device, (ii) determining information required from the first client device to determine the capabilities of the first client device, and (iii) communicating a request for the information to the cognizant agent of the first client device. In such embodiments of the computer-implemented method, the information includes at least one of (i) username, (ii) user passcode, (iii) operating system type, (iv) operating system version, (v) size of random-access memory, and (vi) web browser type.

In further specific embodiments of the computer-implemented method, the cognitive engine is further configured to share a unique session token with the cognitive agent of the first client device, such that the unique session token is exchanged between the cognitive engine and cognitive agent during all subsequent service call session communications.

In other specific embodiments of the computer-implemented method, binding the application programming interface (API) of the determined version of the service application to the first client device further includes, in response to (i) receiving a response from the cognitive agent of the first client device that includes the information, (ii) validating the information and (iii) determining the version of the service application to bind to the first client device based on the determined capabilities, accessing a service repository that stores a plurality of versions of the service application to bind the application programming interface (API) of the determined version of the service application to the first client device.

Moreover, in other specific embodiments of the computer-implemented method, initiating the service request call with the bound API of the determined version of the service application further includes requesting data from the determined version of the service application stored in the service repository and, in response to receiving the data from the determined version of the service application, transforming and formatting the data for cognitive analysis at the cognitive agent of the first client device, and communicating the data to the cognitive agent of the first client device.

A computer program product defines third embodiments of the invention. The computer program product includes a non-transitory computer-readable medium having sets of codes. The sets of codes cause one or more computing processing devices to receive, at a server-side cognitive engine, a service request call from a service application executing on a client device and, in response to receiving the service request call, determine the capabilities of the first client device. The sets of codes further cause the computing processing device(s) to determine a version of the service application to bind to the first client device based on the determined capabilities, bind an application programming interface (API) of the determined version of the service application to the first client device, and initiate the service request call with the bound API of the determined version of the service application.

In specific embodiments of the computer program product, the set of codes for causing the one or more computing processing devices to determine the capabilities of the first client device are further configured for causing the one or more computing processors to (i) identify an API of a current version of the service application executing on the first client device, (ii) determine information required from the first client device to determine the capabilities of the first client device, and (iii) communicate a request for the information to the cognizant agent of the first client device. In related embodiments of the computer program product, the information includes at least one of (i) username, (ii) user passcode, (iii) operating system type, (iv) operating system version, (v) size of random-access memory, and (vi) web browser type. In other related embodiments of the computer program product, the computer-readable medium further comprises a set of codes for causing the one or more computing processing devices to share a unique session token with the cognitive agent of the first client device.

In still further specific embodiments of the computer program product, the set of codes for causing the one or more computing processing devices to bind the application programming interface (API) of the determined version of the service application to the first client device are further configured for causing the one or more computing processors to, in response to (i) receiving a response from the cognitive agent of the first client device that includes the information, (ii) validating the information and (iii) determining the version of the service application to bind to the first client device based on the determined capabilities, access a service repository that stores a plurality of versions of the service application to bind the application programming interface (API) of the determined version of the service application to the first client device.

In other further embodiments of the computer program product, the set of codes for causing the one or more computing processing devices to initiate the service request call with the bound API of the determined version of the service application are further configured for causing the one or more computing processors to (i) request data from the determined version of the service application stored in the service repository, in response to receiving the data from the determined version of the service application, (ii) transform and format the data for cognitive analysis at the cognitive agent of the first client device, and (iii) communicating the data to the cognitive agent of the first client device.

Thus, according to embodiments of the invention, which will be discussed in greater detail below, the present invention provides for the use of cognitive analysis, including artificial intelligence, to determine a client's capabilities and, based on the determined capabilities, dynamically bind the client to a service version that is applicable to the client's capabilities. As a result, the client is loosely coupled/bound with service signatures. Such dynamic coupling/binding avoids the need for a mandatory service version upgrade at the client in the event of a server-side service version upgrade.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
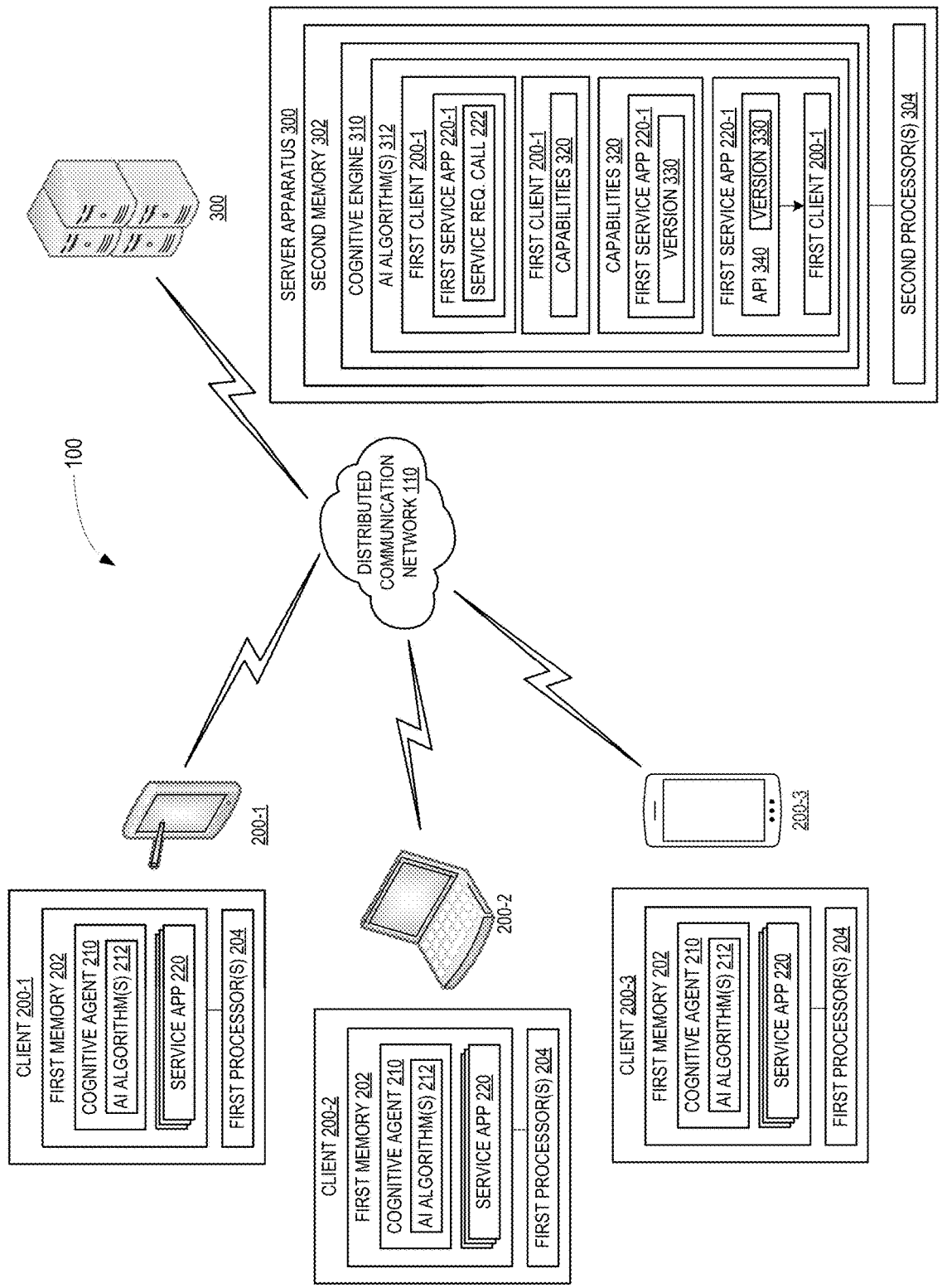
Figure 2:
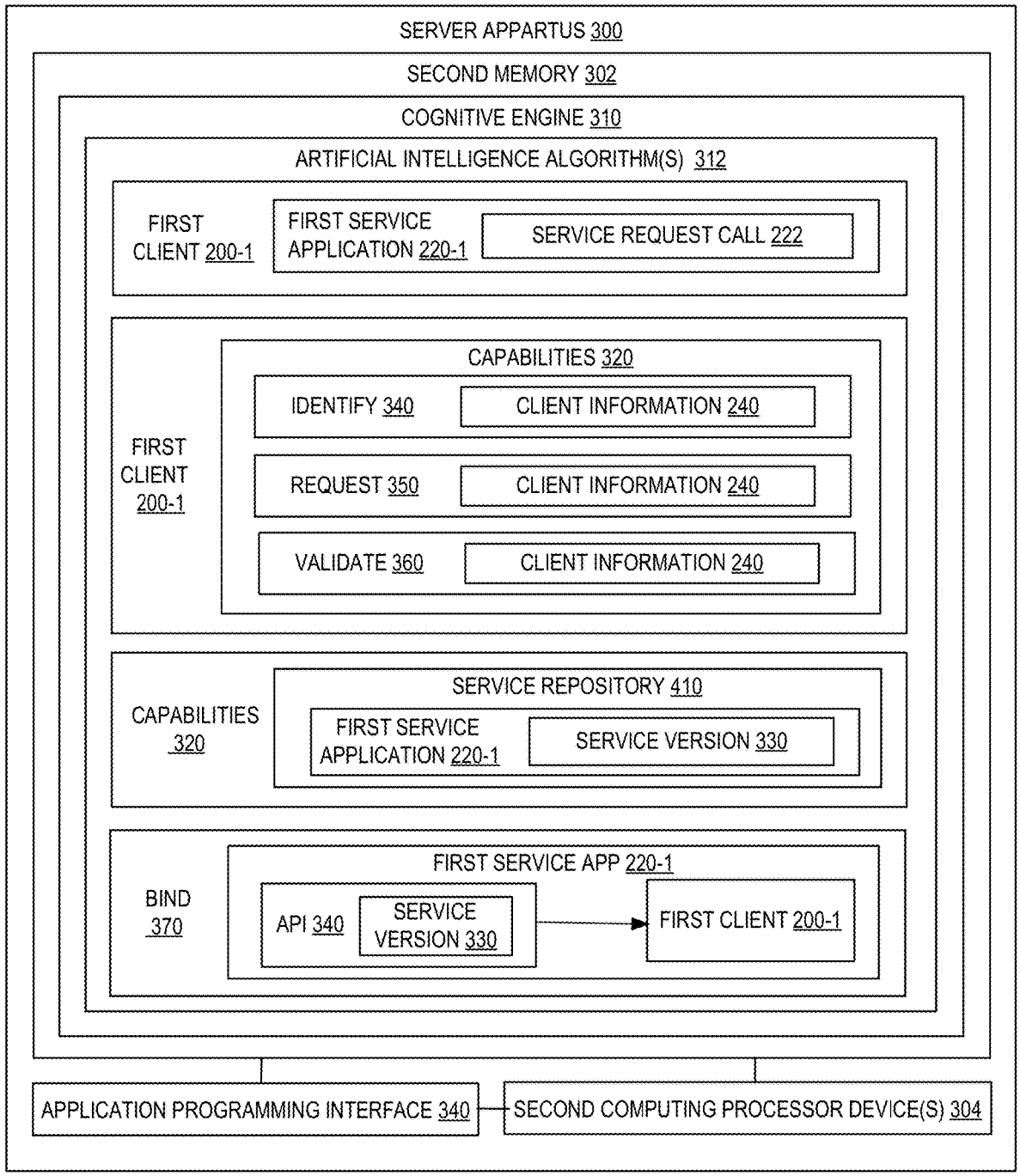
Figure 3:
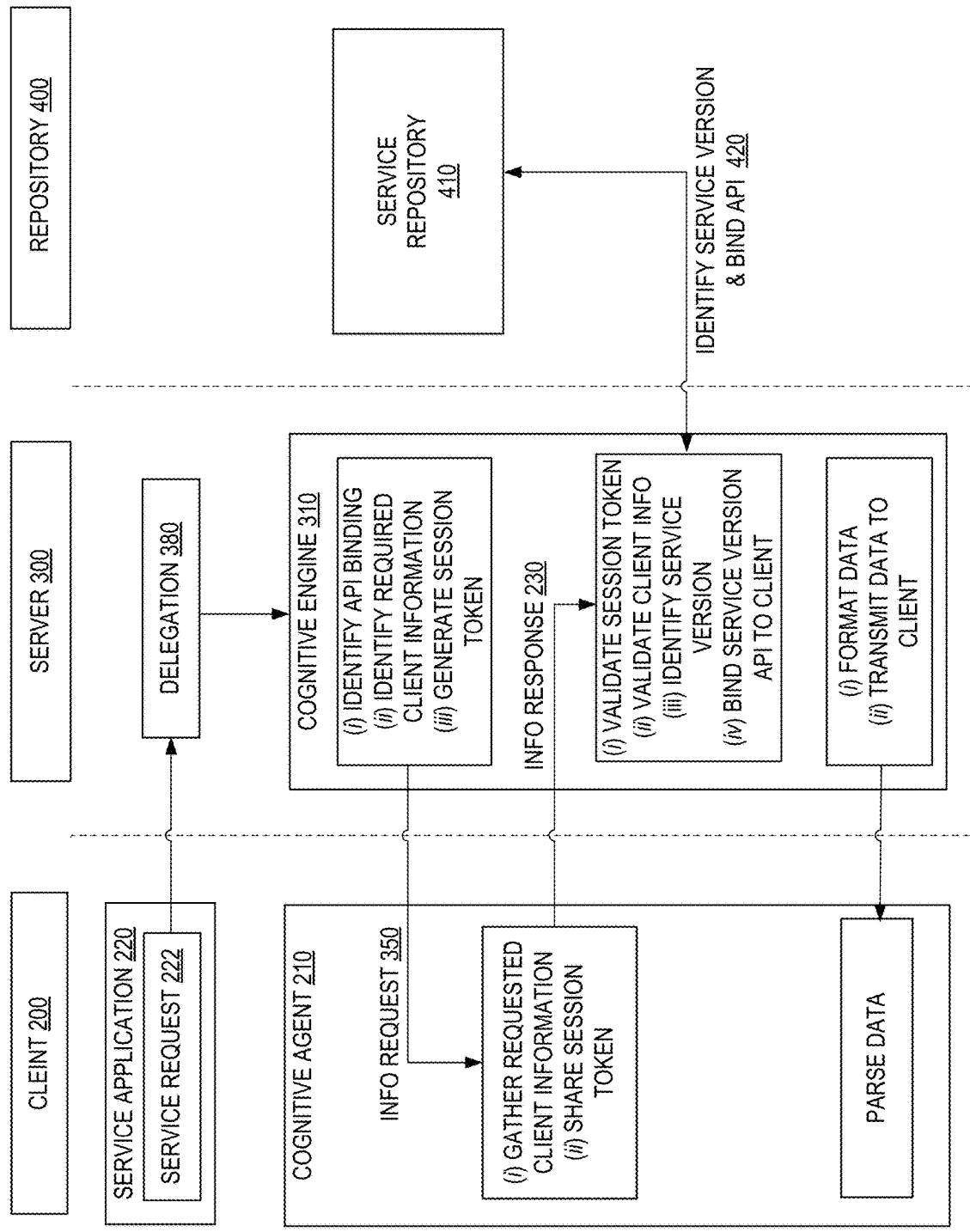
Figure 4:
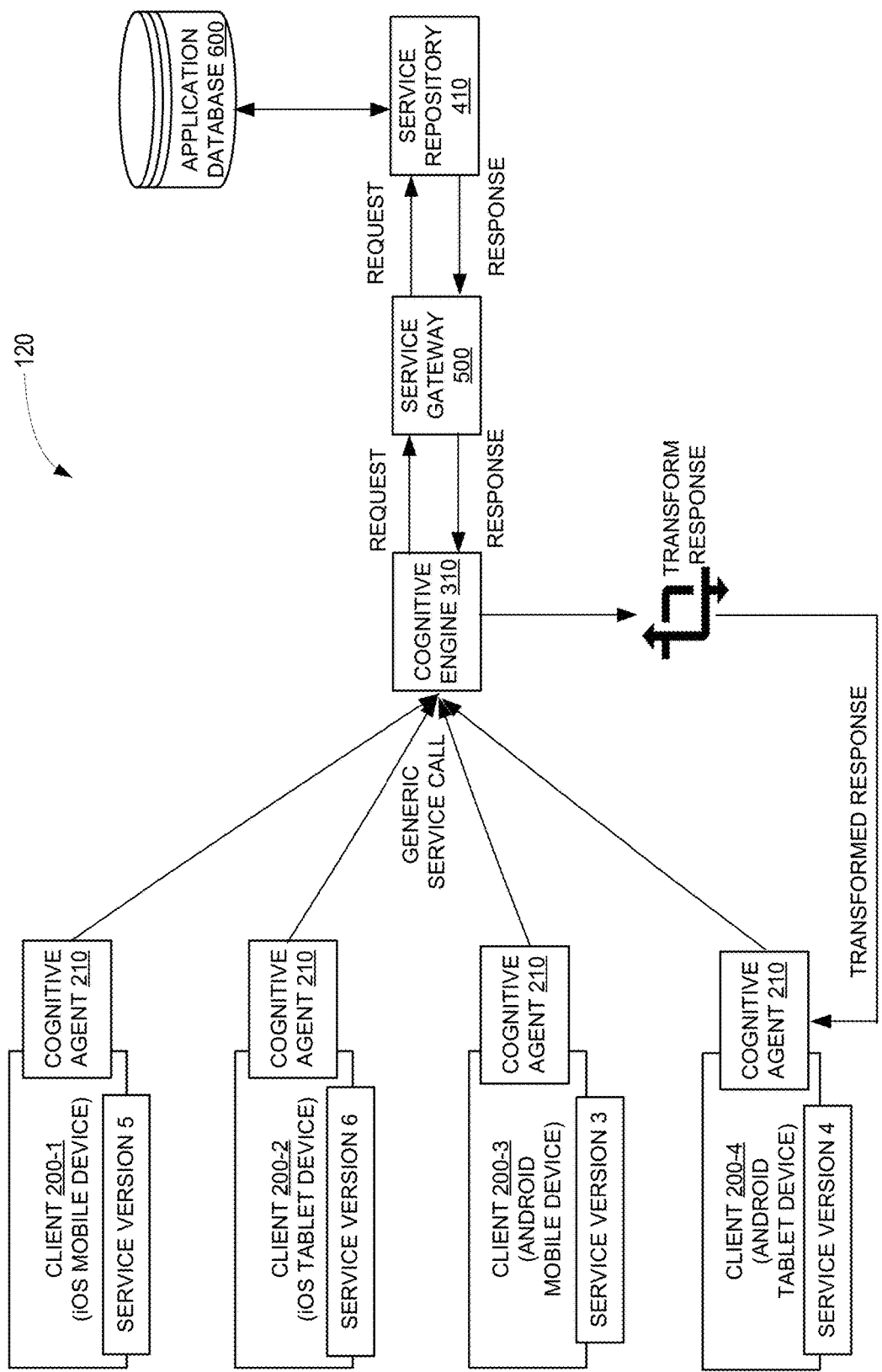
Figure 5:
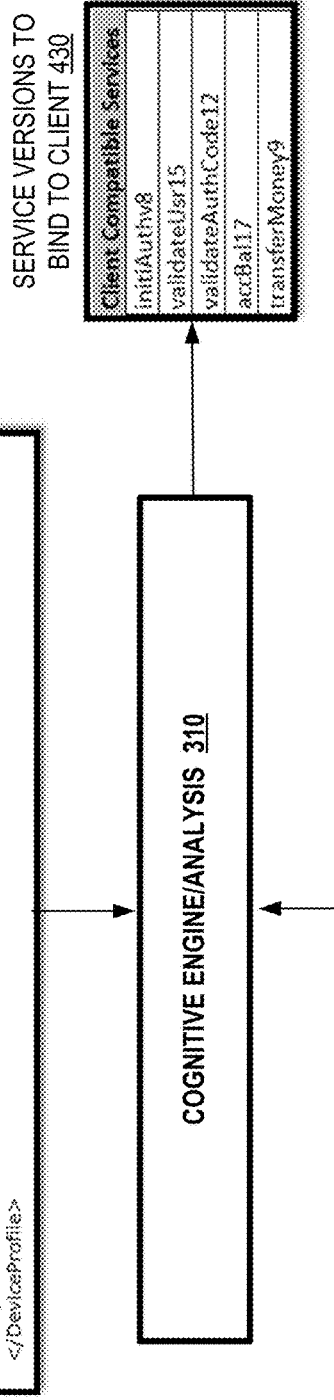

Having thus described embodiments of the disclosure in general terms, reference will now be made to the accompanying drawings, wherein:

FIG. 1 is a schematic/block diagram of a system for artificial intelligence-based service discovery and service binding, in accordance with some embodiments of the present disclosure;

FIG. 2 is a block diagram of a server apparatus configured with a cognitive agent for determining a client's capabilities and binding the client to a service version based on the determined client capabilities, in accordance with some embodiments of the present disclosure;

FIG. 3 is a block/flow diagram of a methodology for artificial intelligence-based service discovery and service binding, in accordance with some embodiments of the present disclosure;

FIG. 4 is a block-flow diagram illustrating different service bindings for different clients based on the determined capabilities of the clients, in accordance with embodiments of the present invention;

FIG. 5 is a block diagram illustrating exemplary information used to determine a client's capabilities through cognitive analysis and the resulting service bindings for the client based on the capabilities, in accordance with embodiments of the present invention.

Figure 6:
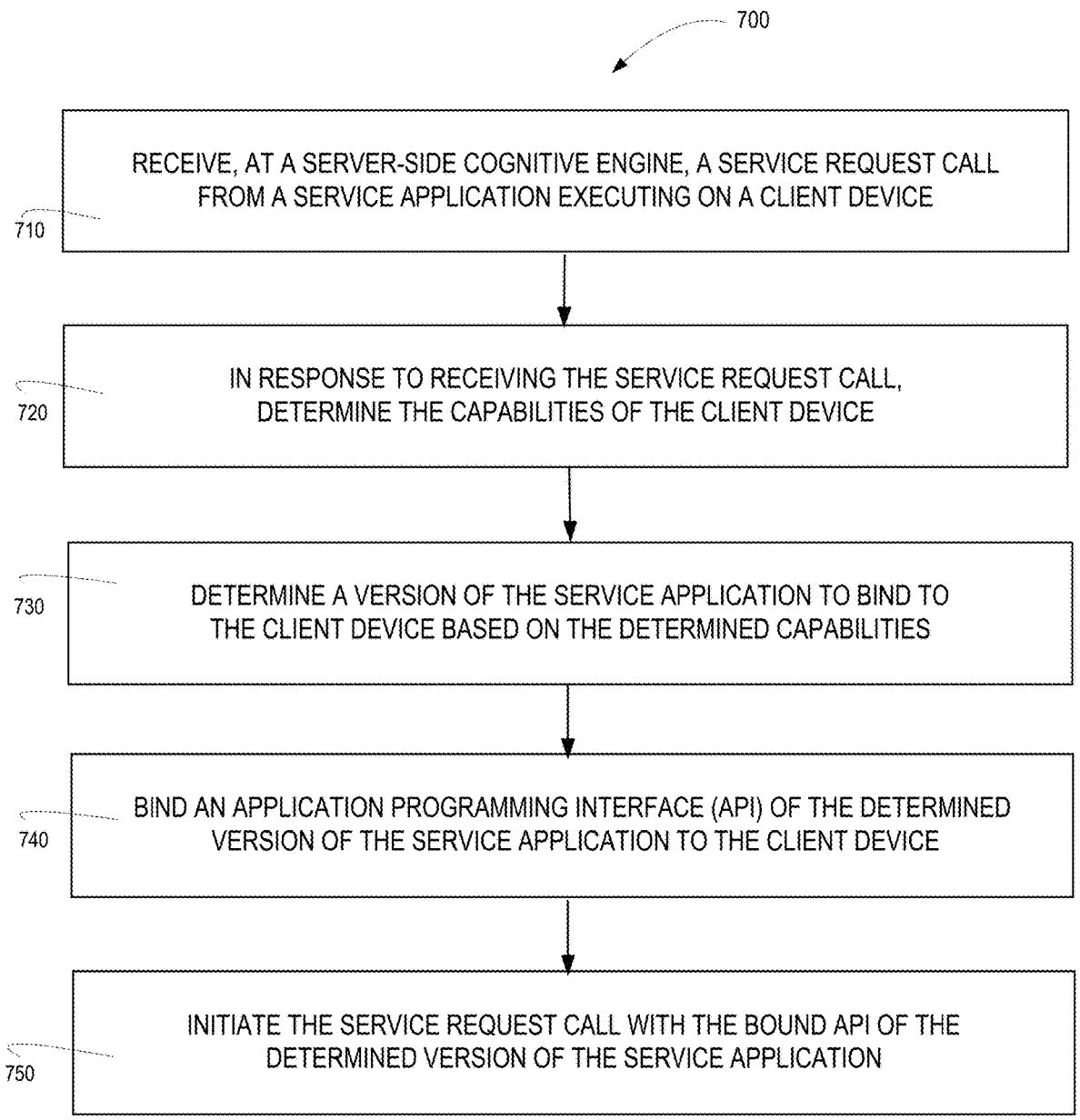

FIG. 6 is a flow diagram of a method for artificial intelligence-based service discovery and service binding, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and computer program products are disclosed that providing for the use of cognitive analysis, including artificial intelligence, to determine a client's capabilities and, based on the determined capabilities, dynamically bind the client to a service version that is applicable to the client's capabilities.

In this regard, a cognitive agent is employed at the client-side and a cognitive engine is employed at the server-side, which communicate with one another during the initial service request communication. Initially, the client makes a generic service request call to the server requesting the information/resource from the web service. Once the server receives the generic service request call, the call is delegated to the cognitive engine, which determines the capabilities of the client through information requests communicated to and responded by the cognitive agent of the client. The information that is returned by the cognitive agent forms the basis for the cognitive engine to determine which service version to bind to the client.

As a result, the present invention provides for loosely coupling the client with service signatures. Such dynamic coupling/binding avoids the need for a mandatory version upgrade at the client in the event of a server-side version upgrade that would otherwise require the client to upgrade in-kind.

Turning now to the figures, FIG. 1 a schematic diagram is provided of a system 100 for artificial intelligence-based service discovery and service binding, in accordance with embodiments of the present invention. The system 100 is implemented within a distributed communication network 110, which may include one or more cellular networks, the Internet, one or more intranets, or the like. The system 100 includes a plurality of clients 200 (shown in FIG. 1 as first client 200-1 (i.e., tablet computing device), second client 200-2 (i.e., laptop computing device) and third client 200-3 (i.e., mobile communication device/smart phone)). Each client includes a first memory 202 and one or more first processor devices 204 in communication with the first memory 202. First memory 202 stores cognitive engine 310 that includes one or more artificial intelligence (AI) algorithms 212 and is executable by at least one of the first processor devices 204. Additionally, first memory 202 stores one or more service applications 220.

The system 100 additionally includes a server apparatus 300 including a second memory 302 and one or more second processor devices 304 in communication with the second memory 302. Second memory 302 stores a cognitive engine 310 that includes one or more artificial intelligence (AI) algorithms 312 and is executable at least one of the one or more second processing devices. The cognitive engine 310 is configured to receive a generic service request call 222 from a first service application 220-1 from amongst the one or more service applications 220 stored and executing on one of the clients 200 (i.e., first client 200-1). In response to receiving the generic service request call 222, cognitive engine 310 is configured to determine the capabilities 320 of the first client 200-1. As discussed in greater detail below, the first client's 200-1 capabilities 320 are determination through cognitive engine 310 communication with first client's 200-1 cognitive agent 210. In response to determining the capabilities 320 of the first client 200-1, cognitive engine 310 is further configured to determine a version 330 of the first service application 220-1 to bind to the first client device 200-1 based on the determined capabilities 320 and, in response, bind an application programming interface (API) 340 of the determined version 330 of the first service application 220-1 to the first client device 200-1 (i.e., the cognitive agent 210 of the first client 200-1). In response to binding the API 340 of the determined version 330 of the first service application 220-1 to the first client 200-1, cognitive engine 310 is configured to initiate the service request call 222 with the bound API 340 of the determined version 330 of the first service application 220-1.

In this regard, if the cognitive engine 310 determines that the first client 200-1 has the capabilities 320 to provide for a more recent updated version 330 of the service application 220-1, the cognitive engine 310 binds the API 340 of the more recent updated version 330 of the service application 220-1 to the first client 200-1. Such binding to a more recent updated version 330 of the service application 220 may occur even though the version of the first service application 220-1 stored and executing of the first client 200-1 may be a previous version. For example, even though first client 200-1 stores and executes version 1.0 of a specific service application 220, the cognitive engine 310 may determine that the capabilities 320 of the first client 200-1 are such that the first client 200-1 can support a more recent updated version, i.e., version 1.1, 1.2 or the like of the service application 220. And, as a result of such a capabilities 320 determination, the cognitive engine 310 binds the first client 200-1 with the API 340 of the more recent updated version (i.e., version 1.1, 1.2 or the like) of the service application 220. As a result of such a binding, cognitive agent 210 is able to act as though first client 200-1 stores and executes the more recent updated version of the service application 220. For example, if first client 220-1 stores and executes version 1.0 of the service application, which requires data to be communicated to the server apparatus in a first format and the cognitive engine 310 subsequently binds the first client 220-1 to a more recent version 1.2 of the service application, which requires data to be communicated to the server apparatus in a second format, the cognitive agent 210 will perform the necessary processing to format the data in the second format. Thus, once the first client 200-1 is bound to a more recent updated version that is not currently stored on the first client, the cognitive agent 210 has the capability to mimic the requirements of the more recent updated version of the service application 220 so that the cognitive engine 310 receives service call that appear as though they are coming from the more recent updated version of the service application 220.

Referring to FIG. 2, a block diagram is presented of server apparatus 300 configured for artificial intelligence-based service discovery and service binding, in accordance with embodiments of the present invention. In addition to providing greater details of the cognitive engine 310, FIG. 2 highlights various alternate embodiments of the invention. Server apparatus 300, which may comprise more than one computing device, such as application servers, repositories, databases or the like, includes second memory 302, which may comprise volatile and non-volatile memory, such as read-only and/or random-access memory (RAM and ROM), EPROM, EEPROM, flash cards, or any memory common to computing platforms). Moreover, second memory 302 may comprise cloud storage, such as provided by a cloud storage service and/or a cloud connection service.

Further, server apparatus 300 also includes at least one second processor device 304, which may be an application-specific integrated circuit ("ASIC"), or other chipset, logic circuit, or other data processing device. Second processor device(s) 304 may execute one or more application programming interface (APIs) 340 that interface with any resident programs, such as cognitive engine 310 or the like, stored in second memory 302 of server apparatus 300 and any external programs. Second processor devices(s) 304 may include various processing subsystems (not shown in FIG. 2) embodied in hardware, firmware, software, and combinations thereof, that enable the functionality of server apparatus 300 and the operability of server apparatus 300 on the distributed communication network 110 (shown in FIG. 1). For example, processing subsystems allow for initiating and maintaining communications and exchanging data with other networked devices. For the disclosed aspects, processing subsystems of sever apparatus 300 may include any subsystem used in conjunction with cognitive engine 310 and related tools, routines, sub-routines, algorithms, sub-algorithms, sub-modules thereof.

Server apparatus 300 may additionally include a communications module (not shown in FIG. 2) embodied in hardware, firmware, software, and combinations thereof, that enables electronic communications between the server apparatus 300 and other networks and network devices, such as clients 200 shown in FIG. 1. Thus, communication module may include the requisite hardware, firmware, software and/or combinations thereof for establishing and maintaining a network communication connection with one or more devices and/or networks.

Second memory 302 of server apparatus 300 stores cognitive engine 310 that is executable by at least one of second computing processor device(s) 304. Cognitive engine 310 includes one or more artificial intelligence algorithms that are configured to cognitively determine which version of a service application to bind to a client requesting a service call. Specifically, cognitive engine 310 is configured to receive a generic service request call 222 from a first service application 220-1 executing on a first client 200.

In response to receiving the service request call 222, cognitive engine 310 is configured to determine the capabilities 320 of the first client 200-1. In specific embodiments of the invention the capabilities 320 of the first client 200-1 are determined by the cognitive engine 310 identifying 340 the client information 240 required to determine the capabilities 320. Such information may include, but is not limited to, (i) username and passcode, (ii) operating system type and version, (iii) memory capacity and availability, (iv) web browser type and version, (v) client brand and model, (vi) power pattern, (vii) application install and last update dates, (viii) client trust score, (ix) patch status and the like. Once the client information 240 has been identified 340, the cognitive engine 310 transmits a request 350 to the cognitive agent 210 (shown in FIG. 1) requesting the client information 240 and, in response to receiving a response from the cognitive agent 210, validates 360 the client information 240. The validated client information 240 serves as the basis for determining the capabilities 320 of the first client 200-1.

In response to determining the capabilities 320 of the first client 200-1, cognitive engine 310 is configured to determine a service version 330 for the first service application 220-1 based at least on the determined capabilities 320. It should be noted that, based on the capabilities 320, the determined service version 330 may be the current service version stored and executing on the first client 220-1 or any upgraded service version (i.e., a service version higher in number than the number of the current service version stored and executing on the first client).

Once the service version 330 has been determined, the cognitive agent is configured to bind 370 an application programming interface (API) 340 of the determined service version 330 of the first service application 220-1 to the first client device 200-1 (i.e., to the cognitive agent 210 of the first client 200-1). Once the first client 200-1 is bound to a service version 330, the cognitive engine 310 is further configured to initiate the service call request by retrieving any requested data from the service depository (shown in FIG. 3) and formatting the data prior to transmission of the data to the first client 220-1.

Referring to FIG. 3, a swim lane flow diagram is presented of a method for artificial intelligence-based real-time service discovery and service binding, in accordance with embodiments of the present invention. Initially, service application 220 executing on client 200 sends a generic service request call 222 to the server 300.

Once the server 300 is in receipt of the service request 222, the service request 22 is delegated 380 to the cognitive engine 310. The cognitive engine 310 is initially configured to identify the Application Programming Interface (API) binding for the current version of the service application 220 that is executing on the client 200 and, through cognitive analysis, identify required client information needed to determine the capabilities of the client. As previously mentioned, the client information may include, but is not limited to, (i) username and passcode, (ii) operating system type and version, (iii) memory capacity and availability, (iv) web browser type and version, (v) client brand and model, (vi) power pattern, (vii) application install and last update dates, (viii) client trust score, (ix) patch status and the like. In addition, the cognitive engine 310 generates a unique session token which shared between the cognitive engine and the cognitive agent throughout the service request communication session for purposes of maintaining security and providing authentication. Once the client information is identified, cognitive engine 310 uses the identified API binding to transmit an information request to the cognitive agent, which includes the session token.

The cognitive agent 210, executing on the client 200, receives the information request 350 and, in response, gathers/obtains the requested client information and transmits an information response 230 back to the cognitive engine along with the session token.

In response to receiving the information response 230, the cognitive engine, validates the client information and accesses the service repository 410 of the repository 400 to identify the service version for the service application 220 based at least on the client information. Once the service version has been identified, the cognitive engine 310 binds the API of the identified service version to the cognitive agent 210 of the client 200.

Once the service version has been bound to the client 200, the service request 222 is made to the service repository and applicable data is returned via the service repository 410 from an application database 600 (shown in FIG. 4). The cognitive engine 310 is configured to transform/format the data for cognitive analysis purposes and transmit the data to the cognitive agent 210 of the client 200.

In response to receiving the data, the cognitive agent 210 is configured to parse and/or re-format the data so that the data is comprehensible to the current version of the service application 220 executing on the client 200.

Referring to FIG. 4, a block diagram is depicted of a system 120 in which different clients 200 are bound to different service versions based on the capabilities of the different clients 200, in accordance with embodiments of the present invention. Specifically, Client 200-1 is a mobile device operating on the iOS platform, Client 200-2 is a tablet device operating on the iOS platform, Client 200-3 is a mobile device operating on the Android platform and Client 200-4 is a tablet device operating on the Android platform. The different device types (mobile vs tablet) and operating system platforms (iOS vs Android) dictate different service versions. For example, client 200-1 is bound to service version 5, while client 200-2 is bound to service version 6, this may be due to the fact that the upgraded version 6 is currently only applicable to tablet devices (i.e., has to be implemented in mobile devices). Similarly, client 200-3 is bound to service version 3, while client 200-4 is bound to service version 4, this also may be due to the fact that the upgraded version 4 is currently only applicable to tablet devices (i.e., has yet to be implemented in mobile devices) and the upgrades in versions 5 and 6 are currently only applicable to iOS devices (i.e., have yet to be implemented in Android devices). It should be noted that any of the clients 200-1, 200-2, 200-3 and 200-4 may currently store the service version of the service application to which they are bound or, a lower/previous version of the service application. As such, when a service version upgrade occurs the client is not mandatorily required to physically upgrade their respective service version in order to continue service access. This is because the real-time service discovery and binding of the present invention provides for the client to be bound to a service version that meets the client's capabilities irrespective of which service version currently physically resides on the client.

Once the clients have been bound to an applicable service version, the cognitive engine 310 processes the service call by requesting the service/data from the application database 600 via the service gateway 500 and service repository 410. In response to receiving the service/data request, service repository 420 returns a response to the cognitive engine 310 via service gateway 500. Cognitive engine 310 is configured to transform the response in accordance with the client's bound service version and communicate the transformed response to the cognitive engine 210 of the respective client 200-2, 200-2, 200-3 or 200-4. The cognitive agent 210 is configured to subsequently parse and/or re-format the data in the response to accommodate the physical service version residing on the respective client 200-2, 200-2, 200-3 or 200-4.

Referring to FIG. 5, a schematic diagram is presented of a system 130 for artificial intelligence (AI)-based real-time service discovery and binding, in accordance with embodiments of the present invention. Server-side cognitive engine 310 receives a service request call and, in response, identifies client information 240 required to assess capabilities and requests the same from the client-side cognitive agent, which gathers the information and responds with the client information 240, shown in FIG. 5. The exemplary client information shown in FIG. 5 includes, (i) operating system type and version, (ii) memory capacity and availability, (iii) client brand and model, (iv) agent type, (v) power pattern, (vi) application install and last update dates, (vii) client trust score, (viii) patch status, (ix) application version and the like.

In response to determining the capabilities of the client based at least on the client information 240 and the versions of the service applications that are meet the capabilities of the client, the cognitive engine 310 accesses the service repository 410 that stores the various different versions of the service applications and identifies the service versions 430 to bind to the client (i.e., the services versions that are compatible to the client). In the example shown in FIG. 5, version 8 of the Initiate Authentication service, version 15 of the validate user/password service, version 12 of the validate authentication code service, version 17 of the account balance service and version 9 of the fund transfer service are the versions that are bound to the client (i.e., the versions that are compatible with the capabilities of the client).

Referring to FIG. 6, a flow diagram is presented of a method 700 for artificial intelligence (AI)-based real-time service discovery and binding, in accordance with embodiments of the present invention. At Event 710, a generic service request call, sent from a service application executing on a client device, is received by a server-side cognitive engine. In response to receiving the service request call, at Event 720, the capabilities of the client device are determined. In specific embodiments of the method, the capabilities are determined by the cognitive engine identifying client information required to assess the capabilities, communicating a request to a client-side cognitive agent which gathers the requested information and, in response to the cognitive engine receiving a response that includes the requested information from the cognitive agent, validating the client information in the response.

In response to determining the capabilities, at Event 730, a service version to bind to the client is determined based at least on the capabilities of the client. The determined service version may be the most recent upgraded service version of the service application, or any other service version which meets the capabilities of the client. In this regard, the determined service version may be the same version currently residing on the client or any subsequent upgraded version that meets the capabilities of the client.

In response to determining the service version at Event 740, the application programming interface (API) of the determined service version is bound to the client device (i.e., bound to the cognitive agent of the client device). In response to the binding, at Event 750, the service request call is initiated. In this regard, the cognitive engine is configured to retrieve the service/data according to the bound service version and format/transform the data for cognitive analysis at the cognitive agent. In response to receiving the service/data, the cognitive agent of the client is configured to parse/re-format the data so that the data is comprehensible by the current version of the service executing on the client.

Thus, present embodiments of the invention provide for the use of cognitive analysis, including artificial intelligence, to determine a client's capabilities and, based on the determined capabilities, dynamically bind the client to a service version that is applicable to the client's capabilities. As a result, the client is loosely coupled/bound with service signatures. Such dynamic coupling/binding avoids the need for a mandatory service version upgrade at the client in the event of a server-side service version upgrade.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein

What is claimed is:

1. A system for real-time service discovery and service binding, the system comprising:
    a plurality of client devices, each client device including a first memory and one or more first processing devices in communication with the first memory, wherein the first memory stores one or more service applications and a cognitive agent including one or more artificial intelligence algorithms that is in communication with the one or more service applications; and
    a server apparatus including a second memory and one or more second processing devices in communication with the second memory, wherein the second memory stores a cognitive engine including one or more artificial intelligence algorithms that is executable by at least one of the one or more second processing devices and configured to:
        receive a service request call from a first service application from amongst the one or more service applications executing on a first client device from amongst the plurality of client devices,
        in response to receiving the service request call, generate a unique session token and determine the capabilities of the first client device by (i) identifying an Application Programming Interface (API) of a current version of the first service application executing on the first client device, (ii) determining, through cognitive analysis using at least one of the artificial intelligence algorithms, information required from the first client device to determine the capabilities of the first client device, (iii) communicating a request, including the unique session token, for the information to the cognitive agent of the first client device, (iv) in response to receiving, from the cognitive agent, a response to the request that includes the information and the unique session token, determining the capabilities of the first client device from the information,
        determine a version of the first service application to bind to the first client device based on the determined capabilities, wherein the determined version is a more recent updated version than the current version of the first service application executing on the first client device,
        bind an API of the determined version of the first service application to the first client device, and
        initiate the service request call with the bound API of the determined version of the first service application,
    wherein, in response to binding the API of the determined version of the first service application to the first client device, the cognitive agent is configured to replicate requirements of the more recent updated version of the service application in communicating subsequent service request calls from the first service application.

2. The system of claim 1, wherein the information includes at least one of (i) username, (ii) user passcode, (iii) operating system type, (iv) operating system version, (v) size of random-access memory, and (vi) web browser type.

3. The system of claim 1, wherein the cognitive engine is further configured to bind the application programming interface (API) of the determined version of the first service application to the first client device by:
    in response to receiving the response from the cognitive agent of the first client device that includes the information, validating the information and determining the version of the first service application to bind to the first client device based on the determined capabilities, access a service repository that stores a plurality of versions of the first service application to bind the application programming interface (API) of the determined version of the first service application to the first client device.

4. The system of claim 3, wherein the cognitive engine is further configured to initiate the service request call with the bound API of the determined version of the first service application by:
    requesting data from the determined version of the first service application stored in the service repository,
    in response to receiving the data from the determined version of the first service application, transforming and formatting the data for cognitive analysis at the cognitive agent of the first client device, and
    communicating the data to the cognitive agent of the first client device.

5. The system of claim 4, wherein the cognitive agent is further configured to receive the data and parse and re-format the data to meet formatting requirements of the current version of the first service application executing on the first client device.

6. A computer-implemented method for real-time service discovery and service binding, the computer-implemented method is executed by one or more computing processor devices and comprising:
    receiving, at a server-side cognitive engine, a service request call from a first service application executing on a client device;
    in response to receiving the service request call, implementing the server-side cognizant engine to generate a unique session token and determine the capabilities of the first client device by (i) identifying an Application Programming Interface (API) of a current version of the first service application executing on the first client device, (ii) determining, through cognitive analysis using at least one artificial intelligence algorithm, information required from the first client device to determine the capabilities of the first client device, (iii) communicating a request, including the unique session token, for the information to a cognitive agent stored on the first client device, (iv) in response to receiving, from the cognizant agent, a response to the request that includes the information and the unique session token, determining the capabilities of the first client device from the information;
    implementing the server-side cognizant engine to determine a version of the first service application to bind to the first client device based on the determined capabilities, wherein the determined version is a more recent updated version than the current version of the first service application executing on the first client device;

binding an application programming interface (API) of the determined version of the first service application to the first client device;

initiating the service request call with the bound API of the determined version of the first service application; and in response to binding the API of the determined version of the first service application to the first client device, implementing the cognitive agent to replicate requirements of the more recent updated version of the service application in communicating subsequent service request calls from the first service application.

7. The computer-implemented method of claim 6, wherein the information includes at least one of (i) username, (ii) user passcode, (iii) operating system type, (iv) operating system version, (v) size of random-access memory, and (vi) web browser type.

8. The computer-implemented method of claim 6, wherein binding the application programming interface (API) of the determined version of the first service application to the first client device further comprises:

in response to (i) receiving the response from the cognitive agent of the first client device that includes the information, (ii) validating the information and (iii) determining the version of the first service application to bind to the first client device based on the determined capabilities, accessing a service repository that stores a plurality of versions of the first service application to bind the application programming interface (API) of the determined version of the first service application to the first client device.

9. The computer-implemented method of claim 8, wherein initiating the service request call with the bound API of the determined version of the first service application further comprises:

requesting data from the determined version of the first service application stored in the service repository, in response to receiving the data from the determined version of the first service application, transforming and formatting the data for cognitive analysis at the cognitive agent of the first client device, and communicating the data to the cognitive agent of the first client device.

10. A computer program product comprising:

a non-transitory computer-readable medium comprising sets of codes for causing one or more computing processing devices to:

receive, at a server-side cognitive engine, a service request call from a first service application executing on a client device;

in response to receiving the service request call, implementing the server-side cognizant engine to generate a unique session token and determine the capabilities of the first client device by (i) identifying an Application Programming Interface (API) of a current version of the first service application executing on the first client device, (ii) determining, through cognitive analysis using at least one artificial intelligence algorithm, information required from the first client device to determine the capabilities of the first client device, (iii) communicating a request, including the unique session token, for the information to a cognitive agent stored on the first client device, (iv) in response to receiving, from the cognitive agent, a response to the request that includes the information and the unique session token, determining the capabilities of the first client device from the information;

implementing the server-side cognizant engine to determine a version of the first service application to bind to the first client device based on the determined capabilities, wherein the determined version is a more recent updated version than the current version of the first service application executing on the first client device;

bind an application programming interface (API) of the determined version of the first service application to the first client device; and initiate the service request call with the bound API of the determined version of the first service application; and in response to binding the API of the determined version of the first service application to the first client device, implement the cognitive agent to replicate requirements of the more recent updated version of the service application in communicating subsequent service request calls from the first service application.

11. The computer program product of claim 10, wherein the information includes at least one of (i) username, (ii) user passcode, (iii) operating system type, (iv) operating system version, (v) size of random-access memory, and (vi) web browser type.

12. The computer program product of claim 10, wherein the set of codes for causing the one or more computing processing devices to bind the application programming interface (API) of the determined version of the first service application to the first client device are further configured for causing the one or more computing processors to:

in response to (i) receiving the response from the cognitive agent of the first client device that includes the information, (ii) validating the information and (iii) determining the version of the first service application to bind to the first client device based on the determined capabilities, access a service repository that stores a plurality of versions of the first service application to bind the application programming interface (API) of the determined version of the first service application to the first client device.

13. The computer-implemented method of claim 12, wherein the set of codes for causing the one or more computing processing devices to initiate the service request call with the bound API of the determined version of the first service application are further configured for causing the one or more computing processors to:

request data from the determined version of the first service application stored in the service repository, in response to receiving the data from the determined version of the first service application, transform and format the data for cognitive analysis at the cognitive agent of the first client device, and communicate the data to the cognitive agent of the first client device.

\* \* \* \* \*